(12) United States Patent
Gong et al.

(10) Patent No.: US 7,854,907 B2
(45) Date of Patent: Dec. 21, 2010

(54) PROCESS FOR THE EXTRACTION OF TECHNETIUM FROM URANIUM

(75) Inventors: Cynthia-May S. Gong, San Mateo, CA (US); Frederic Poineau, Las Vegas, NV (US); Kenneth R. Czerwinski, Las Vegas, NV (US)

(73) Assignee: The Board of Regents of the Nevada System of Higher Education of the University of Nevada, Las Vegas, Las Vegas, NV (US)

( * ) Notice: Subject to any disclaimer, the term of this patent is extended or adjusted under 35 U.S.C. 154(b) by 1 day.

(21) Appl. No.: 12/313,354

(22) Filed: Nov. 19, 2008

(65) Prior Publication Data

US 2010/0124522 A1    May 20, 2010

(51) Int. Cl.
*B01D 11/00* (2006.01)

(52) U.S. Cl. .............................. 423/9; 75/393

(58) Field of Classification Search ............... 423/9; 75/393

See application file for complete search history.

(56) References Cited

U.S. PATENT DOCUMENTS

| | | | |
|---|---|---|---|
| 3,900,551 A | 8/1975 | Bardoncelli et al. ............ 423/9 |
| 4,162,230 A | 7/1979 | Horwitz et al. ............. 252/640 |
| 4,443,413 A | 4/1984 | Pruett et al. .................. 423/10 |
| 4,528,165 A * | 7/1985 | Friedman ..................... 423/10 |
| 4,764,352 A | 8/1988 | Bathellier et al. ............. 423/10 |
| 5,443,731 A | 8/1995 | Moyer et al. ................ 210/634 |
| 6,093,375 A | 7/2000 | Taylor et al. ................... 423/8 |
| 6,444,182 B1 | 9/2002 | Baranov et al. ................ 423/9 |
| 2008/0224106 A1* | 9/2008 | Johnson et al. ............. 252/625 |

FOREIGN PATENT DOCUMENTS

RU        2200993 C2 *   3/2003

* cited by examiner

*Primary Examiner*—Melvin C Mayes
*Assistant Examiner*—Melissa Stalder
(74) *Attorney, Agent, or Firm*—Mark A. Litman & Associates, P.A.

(57) ABSTRACT

A spent fuel reprocessing method contacts an aqueous solution containing Technetium(V) and uranyl with an acidic solution comprising hydroxylamine hydrochloride or acetohydroxamic acid to reduce Tc(V) to Tc(II), and then extracts the uranyl with an organic phase, leaving technetium(II) in aqueous solution.

7 Claims, 7 Drawing Sheets

♦ no AHA. ■, 0.5 M AHA;   , 1.0 M AHA; ●, 2.0 M AHA; ◊, 3.0 M AHA; □, 4.0 M AHA; △, 5.0 M AHA.

♦ no AHA. ■, 0.5 M AHA; , 1.0 M AHA; ●, 2.0 M AHA; ◊, 3.0 M AHA; □, 4.0 M AHA; △, 5.0 M AHA.

FIG. 8 FORMULA 1 and SCHEME 1

SCHEME 1

PROCESS FOR THE EXTRACTION OF TECHNETIUM FROM URANIUM

NOTIFICATION OF GOVERNMENT FUNDING

This invention was made under US Department of Energy Contract Number DE-FC07-06ID14781, P. I. Kenneth R. Czerwinski.

BACKGROUND OF THE INVENTION

1. Field of the Invention

This invention relates to nuclear fuel processing and/or reprocessing and is particularly concerned with the control and/or extraction of technetium in the processing and/or reprocessing of spent uranium fuel.

2. Background of the Art

One of the major commercial issues with nuclear energy is the production of spent radioactive waste and its disposal or reuse. There are limited facilities for the storage of waste and there has been significant resistance to the expansion of existing storage facilities and the building of new storage facilities. The problem can be alleviated by recycling spent fuel cells, but this requires a complex process of purification of the spent fuel cells to provide a grade of fuel (e.g., uranium) that is of the required purity to be used in a reactor. The presence of specific waste bye-products in spent fuel cells prevents the bye-product from being useful. The selective removal of each of the various waste ingredients is a complex and exacting procedure. Each separate contaminant may have to be removed by individual procedures that target individual wastes, which often are elemental in nature or elemental salts. One particularly troubling contaminant for uranium fuels is technetium.

U.S. Pat. No. 6,093,375 describes the use of an extraction process in the Purex Process in an Advanced Reprocessing Plant (ARP). In Purex reprocessing, neptunium valency control can be a significant problem. Neptunium is present in the Purex process as a mixture of three different valence states Np(IV), (V) and (VI). Np(M) and (VI) are both extractable into the solvent phase (tributyl phosphate (TBP) diluted in an inert hydrocarbon such as odorless kerosene (OK)) whereas Np(V) is inextractable into this phase. In order to direct Np to raffinate streams, Np has to be stabilized in the (V) oxidation state. This is a complex matter, since not only is it the middle oxidation state of three but Np(V) also undergoes competing reactions, such as disproportionation to Np(IV) and (VI) and is oxidized to Np(VI) by nitric acid. Neptunium control is therefore difficult and efficient neptunium control is a major aim of an advanced reprocessing program. This U.S. Pat. No. 6,093,375 describes that formohydroxamic acid (FHA) may be used to control neptunium in spent fuel reprocessing. An aqueous solution is formed and at least one solvent extraction step, characterized in that formohydroxamic acid is used to reduce any Np(VI) to Np(V) and/or to form a complex with Np(IV) whereby substantially all the neptunium present will be retained in the aqueous phase during solvent extraction. A particularly useful property of FHA in the context of the extraction process is that it is easily destroyed either by acid hydrolysis to formic acid and hydroxylamine or by nitric acid to component gases. Therefore the Np can be recovered from the FHA solution and the destruction of FHA will reduce radioactive liquid waste volumes.

U.S. Pat. No. 3,900,551 describes the selective extraction of metals from acidic uranium (VI) solutions using neo-tridecano-hydroxamic acid. The use of this hydroxamic acid and functionalized derivatives as a complexing agent is to extract uranyl into organic solvents.

U.S. Pat. No. 4,162,230 describes a method for the recovery of actinide elements from nuclear reactor waste. The process adds hydroxylammonium nitrate and hydrazine to the waste feed reduce Pu and Np to a tetravalent state. These tetravalent state elements are then extracted with organophosphates in an organic diluent.

U.S. Pat. No. 4,443,413 describes the separation of uranium from technetium in recovery of spent nuclear fuel by contacting an aqueous PUREX product stream with hydrazine to reduce pertechnetate. This reduced material is then extracted with a TBP/organic solvent to extract uranyl.

U.S. Pat. No. 4,528,165 also describes the separation of uranium from technetium in recovery of spent nuclear fuel. This is accomplished by contacting the aqueous PUREX product stream with hydrazine to reduce pertechnetate. This product is then complex reducted Tc with oxalate and then uranyl is extracted with 30% TBP/n-dodecane solvent.

U.S. Pat. No. 4,764,352 describes a process for preventing the extraction of technetium and/or rhenium, particularly during the extraction of uranium and/or plutonium by an organic solvent. Re and/or Tc are complexed with a Zr and/or Hf material. U and Pu are extracted with an organophosphate in an organic solvent.

U.S. Pat. No. 5,443,731 describes a process for extracting technetium from alkaline solutions. Various complexing crown ethers in an organic diluent remove technetium from an alkali metal nitrate solution.

U.S. Pat. Nos. 6,093,375 and 6,444,182 disclose nuclear fuel reprocessing Np(VI) is reduced to Np(V/IV) or Np(V) and/or complexed with formohydroxamic acid or N-substituted hydroxamic acid, respectively, to prevent its extraction into the organic phase.

SUMMARY OF THE INVENTION

A composition comprising uranium is enhanced in purity by reaction of a uranium composition having contamination levels of heptavalent technetium (pertechnetate, or $TcO_4^-$) with at least one of acetohydroxamic acid (AHA, i.e., N-hydroxy-acetamide, or N-acetyl-hydroxylamine) in an acid environment (preferably an inorganic acid, such as e.g., in mineral acid [nitric—$HNO_3$, hydrochloric—HCl, and perchloric—$HClO_4$]. Pertechnetate undergoes reductive nitrosylation to form transaquo-nitrosyl-technetium(II) diacetohydroxamate (or $[Tc(NO)(AHA)_2.H_2O]^+$). This forms a partially complexed uranium composition. The complex of this partially complexed uranium composition is extremely hydrophilic and not extracted by 30% tributylphosphate (TBP). The uranium is then extracted from the complexed uranium composition by organic solvent, such as one comprising TBP.

DETAILED DESCRIPTION OF THE INVENTION

Uranium is extracted from Technetium-contaminated uranium compositions by forming altered valence states of the technetium (especially by reduction) and forming technetium products that are not as readily soluble (or are essentially insoluble) in organic solvents such as those comprising tributylphosphate. A preferred reagent in the alteration of the technetium state is acetohydroxamic acid (AHA, i.e., N-hydroxy-acetamide, or N-acetyl-hydroxylamine). The reaction is preferably performed in an acid environment (preferably an inorganic acid, such as e.g., in mineral acid [nitric—$HNO_3$, hydrochloric—HCl, and perchloric—$HClO_4$].

Figure 8:
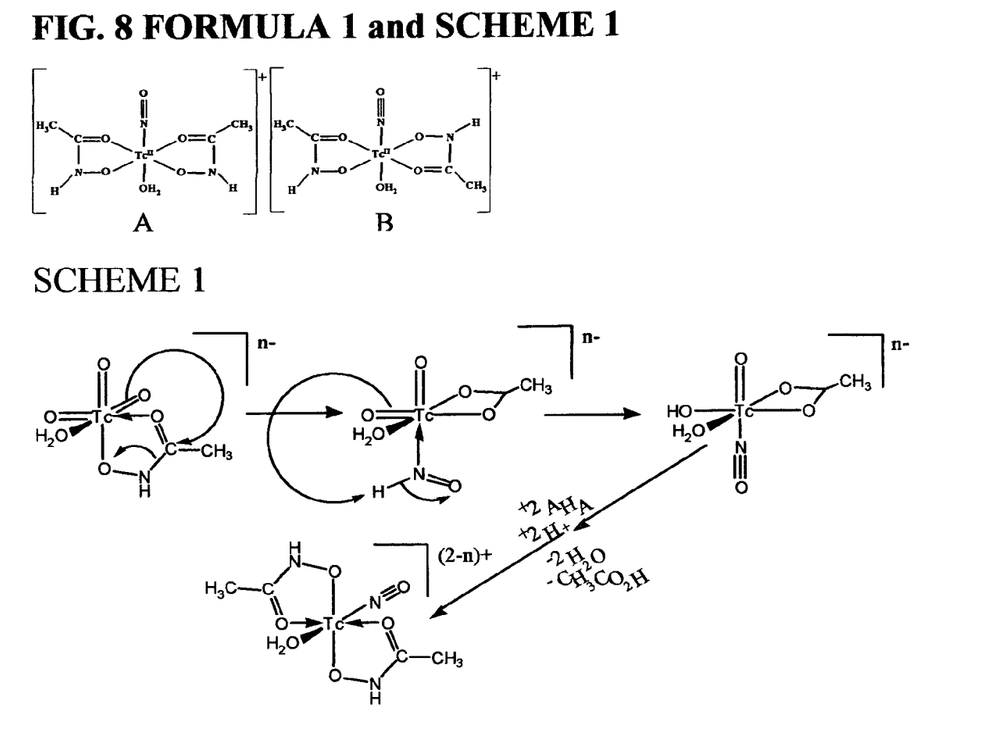
FIG. 8 shows Formula 1 of two compounds relevant to the present technology, A, trans-aquonitrosyl-cis-diacetohydroxamic-technetium(II). B, trans-aquonitrosyl-trans-diacetohydroxamic-technetium(II) and also shows Scheme 1: Proposed mechanism for reductive nitrosylation of Tc(VI) (n=1) or Tc(V) (n=2) by AHA.

In this work, it is demonstrated that pertechnetate undergoes reductive nitrosylation by AHA under a variety of conditions. The resulting divalent technetium is complexed by AHA to form the pseudo-octahedral trans-aquonitrosyl(diacetohydroxamic)-technetium(II) complex ($[Tc^{II}(NO)(AHA)_2 H_2O]^+$) (1, Formula 1), as characterized by extended x-ray absorption fine structure spectroscopy (EXAFS)—the first EXAFS reported for a Tc nitrosyl complex. This complex is the sole technetium product of the reaction and is different from the product of reaction of pertechnetate with the AHA hydrolysis products hydroxylamine and acetic acid. The observed partial orders of the reagents were determined and a potential mechanism proposed. In contrast to AHA complexes of other divalent transition metals, divalent uranyl, and Cr(V), Formula 1 is very soluble in water and stable for months in a 0.235 M solution. Like the Pu and Np AHA complexes, Formula 1 is extremely hydrophilic and does not extract into 30% TBP in dodecane, which could be exploited in nuclear fuel separation schemes. Its stability, solubility, and straightforward aqueous synthesis could allow its use as a precursor to other technetium nitrosyl complexes.

Formula 1. A, trans-aquonitrosyl-cis-diacetohydroxamic-technetium(II). B, trans-aquonitrosyl-trans-diacetohydroxamic-technetium(II)

There are significant technical and commercial advantages of the present technology over the processes and materials of the prior art. For example, with respect to U.S. Pat. No. 3,900,551, the neo-tridecano-hydroxamic acid (NTHA) used in this disclosure is quite different from acetohydroxamic acid (AHA), with a very different structure, solubility, and chemical reactivity. The basis of this patent is an extraction where NTHA is needed to pull uranium into an organic phase. The present technology uses AHA to reduce a different element, technetium, and change the extraction properties of technetium without affecting the extraction properties of uranium. This patent also effects only a complexation, while the technology described in the present invention involves a chemical reaction that changes the technetium oxidation state and solubility properties.

Other disclosed technologies use hydrazine as a reductant for various elements, which is an unstable component of rocket fuel. This must be compared to the use in the present invention of AHA, which is used as a pharmaceutical. Furthermore, AHA complexes the reduced technetium to increase its affinity for water, while hydrazine is not reported as effecting that step.

In U.S. Pat. No. 4,764,352, complexation is used to prevent the extraction of transition metals and separate them from actinides. The complexing agents used are more transition metals, and may require technetium to be in a particular oxidation state. The present technology effects the reduction and complexation of both Tc(VII) (the likeliest) and Tc(IV) (also very stable) while avoiding the introduction of further elements into the waste stream, since AHA decomposes into nitrogen and carbon dioxide gas and water.

Other technologies outside the scope of the present invention use a complexant that specifically enhances the extraction of uranium(VI) from an aqueous solution into an organic phase, whereas the present technology uses a reduction and complexation of technetium to prevent tecnetium extraction into an organic phase.

U.S. Pat. Nos. 6,093,375 and 6,444,182 disclose nuclear fuel reprocessing Np(VI) is reduced to Np(V/IV) or Np(V) and/or complexed with formohydroxamic acid or N-substituted hydroxamic acid, respectively, to prevent its extraction into the organic phase. Even though this involves a hydroxamic acid to separate radioactive waste during an extraction via selective reduction and complexation and both reductant/complexants prevent the extraction of the target elements into an organic phase, there are significant further differences. These references use formohydroxamic acid materials to reduce and complex neptunyl elemental material. The present technology uses acetohydroxamic acid to reduce and complex tecnetium. In particular, with respect to U.S. Pat. No. 6,444,182, hydroxylamines reduce and complex neptunyl. N-substituted hydroxamic acids have similarities in structure to AHA, but they are distinct from one another chemically. Hydroxamic acids additionally contain an carboxy functional group, that significantly changes the acidity, reactivity, solubility, and reduction potential of the The invention described here has explored the reaction of heptavalent technetium (pertechnetate, or $TcO_4^-$) with acetohydroxamic acid (AHA, a.k.a. N-hydroxy-acetamide, or N-acetyl-hydroxylamine) in mineral acid (nitric—$HNO_3$, hydrochloric—HCl, and perchloric—$HClO_4$). Pertechnetate undergoes reductive nitrosylation to form transaquo-nitrosyl-technetium(II) diacetohydroxamate (or $[Tc(NO) (AHA)_2.H_2O]^+$). This complex is extremely hydrophilic and not extracted by 30% tributylphosphate in an alkane diluent (TBP).

Hexavalent uranium (a.k.a. uranyl, $UO_2^{2+}$) complexes to, but does not react with AHA in these mineral acids. Uranium is extracted into TBP normally, dependent on several factors, such as the concentrations of acid, nitrate, TBP, and uranium, and the temperature.

In the absence of AHA, in these mineral acids, pertechnetate follows uranyl into the organic phase either as pertechnetic acid ($HTcO_4$) or as an adduct of uranyl and TBP (e.g., $UO_2(NO_3)(TcO_4).2TBP$). It is thus difficult to separate uranium from technetium using TBP solvent extraction from aqueous mineral acid.

When a mixture of uranyl and pertechnetate with up to thousandfold molar excess uranyl and an excess of AHA in one of these mineral acids, it is reductively nitrosylated at approximately the same rate as in the absence of uranyl, and the product is not extracted by TBP. By allowing the reaction to proceed to equilibrium, then readjusting the acid concentration, the resulting mixture can be separated via solvent extraction. Readjusting the nitric acid concentration to 1 M results in as much as 96% of the uranium being extracted, with no measurable extracted technetium.

This separation is achieved using techniques and reagents currently proposed for use in the UREX process. Adoption of this technique could achieve the separation of uranium from technetium without the need for additional equipment or the addition of new reagents, with the requirements they need for safety assessment, to the process.

As a separate observation, we have noted similar behavior using hydroxylamine hydrochloride instead of AHA to produce a technetium nitrosyl, $Tc(NO)(NH_3)_4 \cdot H_2O$. This complex has been known for decades, but this is believed to be the first application showing its synthesis directly from an aqueous pertechnetate precursor and the first evidence that it does not extract into 30% TBP. This method is not as preferred as using AHA, however, since hydroxylamine HCl reacts with pertechnetate to form at least three distinct products, two of which (a yet-uncharacterized yellow compound that is thought to be $Tc(NH_2OH)_4$, and $TcNOCl_5$) extract into TBP. Hydroxylamine is a chemical also being considered for use at various points in the fuel reprocessing cycle.

If a commercial reprocessing plant utilizing the UREX+ process were ever built for the recycling of nuclear fuel, our process could be a valuable, cost-saving, and time-saving method for the separation of reusable uranium fuel from technetium poison in the last step. Current methods being explored include ion exchange, electroplating, and the introduction of other reductants and complexants, such as hydrazine, hydroxylamine, and oxalate, into the process stream. Our method utilizes the equipment already built (solvent extraction) and reagents already vetted (AHA, nitric acid) for other portions of the reprocessing stream, and AHA is not explosive or highly reactive like its rivals hydroxylamine and hydrazine, nor poisonous like oxalate.

The following reaction conditions were systematically evaluated in experimental practices of the present technology.

TABLE 1

Reaction conditions. All mixtures had a final volume of 1 mL and a concentration of 1 M $HNO_3$. [AHA] in Molar quantities, [Tc] and [U] in mM.

| No. | [Tc] | [AHA] | [U] |
|---|---|---|---|
| AHA controls | | | |
| 1 | 0.50 | 0 | 0 |
| 2 | 0.50 | 0 | 0.25 |
| 3 | 0.50 | 0 | 0.50 |
| 4 | 0.50 | 0 | 1.0 |
| 5 | 0.50 | 0 | 2.0 |
| 6 | 0.50 | 0 | 5.0 |
| 7 | 0.50 | 0 | 10 |
| 8 | 0.50 | 0 | 20 |
| 9 | 0.50 | 0 | 50 |
| U controls | | | |
| 10 | 0.50 | 0 | 0 |
| 11 | 0.50 | 0.5 | 0 |
| 12 | 0.50 | 1.0 | 0 |
| 13 | 0.50 | 2.0 | 0 |
| 14 | 0.50 | 3.0 | 0 |
| 15 | 0.50 | 4.0 | 0 |
| Tc controls | | | |
| 16 | 0 | 0 | 1.0 |
| 17 | 0 | 0.5 | 1.0 |
| 18 | 0 | 1.0 | 1.0 |
| 19 | 0 | 2.0 | 1.0 |
| 20 | 0 | 3.0 | 1.0 |
| 21 | 0 | 4.0 | 1.0 |
| 22 | 0 | 0 | 10 |
| 23 | 0 | 0.5 | 10 |
| 24 | 0 | 1.0 | 10 |
| 25 | 0 | 2.0 | 10 |
| 26 | 0 | 3.0 | 10 |
| 27 | 0 | 4.0 | 10 |
| 28 | 0 | 4.0 | 0 |
| 29 | 0 | 4.0 | 0.25 |
| 30 | 0 | 4.0 | 0.50 |
| 31 | 0 | 4.0 | 1.0 |
| 32 | 0 | 4.0 | 2.0 |
| 33 | 0 | 4.0 | 5.0 |
| 34 | 0 | 4.0 | 10 |
| 35 | 0 | 4.0 | 20 |
| 36 | 0 | 4.0 | 50 |
| Tc-U-AHA | | | |
| 37 | 0.50 | 4.0 | 0 |
| 38 | 0.50 | 4.0 | 0.25 |
| 39 | 0.50 | 4.0 | 0.50 |
| 40 | 0.50 | 4.0 | 1.0 |
| 41 | 0.50 | 4.0 | 2.0 |
| 42 | 0.50 | 4.0 | 5.0 |
| 43 | 0.50 | 4.0 | 10 |
| 44 | 0.50 | 4.0 | 20 |
| 45 | 0.50 | 4.0 | 50 |
| 46 | 0.50 | 0 | 1.0 |
| 47 | 0.50 | 0.5 | 1.0 |
| 48 | 0.50 | 1.0 | 1.0 |
| 49 | 0.50 | 2.0 | 1.0 |
| 50 | 0.50 | 3.0 | 1.0 |
| 51 | 0.50 | 4.0 | 1.0 |
| 52 | 0.50 | 0 | 10 |
| 53 | 0.50 | 0.5 | 10 |
| 54 | 0.50 | 1.0 | 10 |
| 55 | 0.50 | 2.0 | 10 |
| 56 | 0.50 | 3.0 | 10 |
| 57 | 0.50 | 4.0 | 10 |
| 58 | 0.50 | 0 | 20 |
| 59 | 0.50 | 0.5 | 20 |
| 60 | 0.50 | 1.0 | 20 |
| 61 | 0.50 | 2.0 | 20 |
| 62 | 0.50 | 3.0 | 20 |
| 63 | 0.50 | 4.0 | 20 |
| 64 | 0.50 | 0 | 50 |
| 65 | 0.50 | 0.5 | 50 |
| 66 | 0.50 | 1.0 | 50 |
| 67 | 0.50 | 2.0 | 50 |
| 68 | 0.50 | 3.0 | 50 |
| 69 | 0.50 | 4.0 | 50 |

Figure 1:
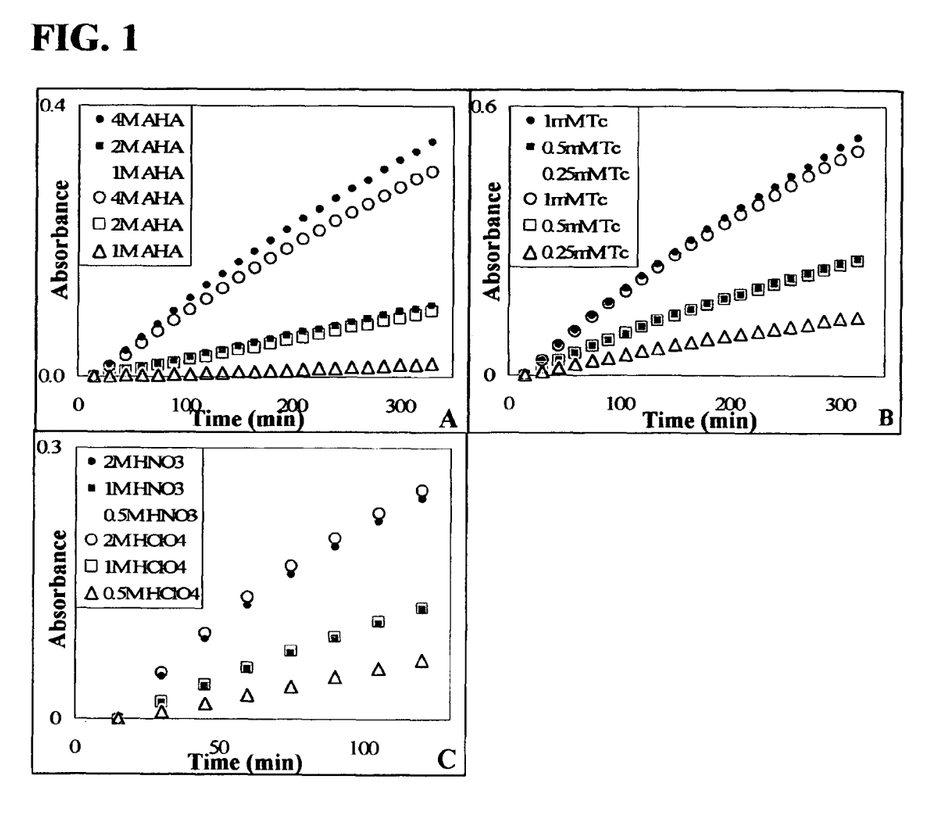
FIG. 1 shows a kinetics diagram for processes according to the technology described herein.
Figure 2:
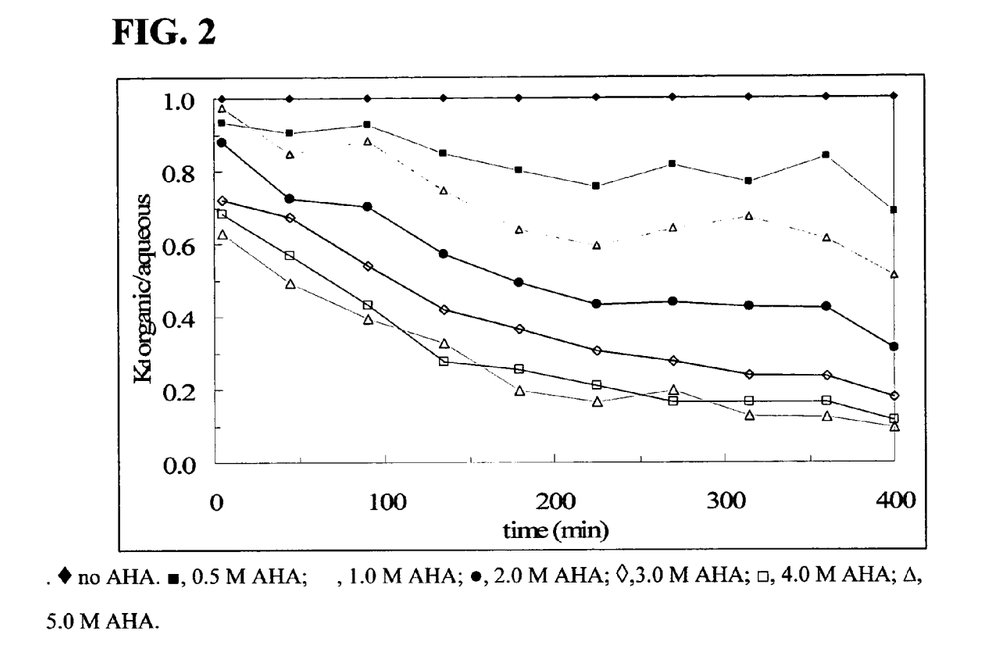
FIG. 2 shows results for extraction processes according to technology described herein.
Figure 3:
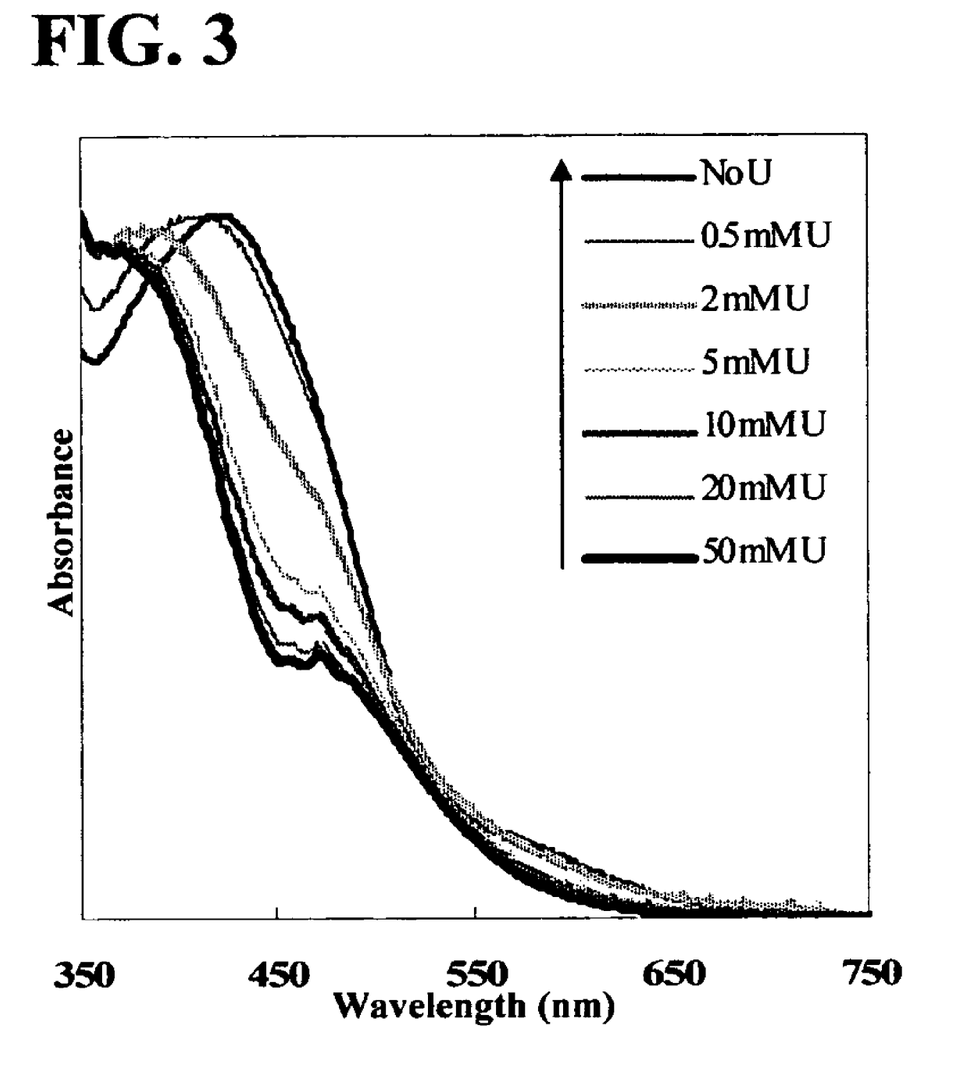
FIG. 3 shows absorbance versus wavelength for products produced according to extraction methods according to the present technology.

FIG. 3. Spectroscopy of 0.5 mM Tc, 4 M AHA, with 0-50 mM U. Spectra are Normalized.

The visible spectra of samples 37-45 (FIG. 3) indicate that there is no mixed Tc-U-AHA species being formed; all spectra can be deconvoluted to the basis UAHA and TcNO-AHA spectra. The high absorbance of nitrate below 350 nm prevents the analysis of the UV spectrum. The change in the uranyl samples over time is consistent with a pH change 10. This is likely due to the thermal breakdown of AHA in nitric acid and the subsequent rise in pH 13. The change in all samples is identical but accelerated at higher temperatures, reflecting the increased rate of AHA hydrolysis in the UAHA spectra, and the increased rate of reductive nitrosylation in the TcNO-AHA spectra.

The spectra of samples 1-9, which do not contain AHA, matched uranyl nitrate and did not change over the 6 hours observed. The spectra of samples 10-15, which contained no U, changed as previously observed as pertechnetate was reduced to TcNO-AHA. The higher the AHA concentration, the further the reaction proceeded. The spectra of samples 16-36, which did not contain Tc, were of UAHA. They were identical in shape, though the absolute absorbance was higher with higher [AHA].

At the beginning of the reactions, uranyl nitrate microstructure is observed in the spectra containing higher [U]. The spectrum of UAHA is pH dependent, and the uranyl nitrate character disappears with time as the spectra becomes identical with UAHA at pH 4.72 (10). This is the $pK_a$ of acetic acid, the hydrolysis product of AHA. As the uranyl concentration exceeds twentyfold excess (samples 43-45, 52-67), UAHA dominates over TcNO-AHA and the differences among the spectra become negligible.

TcNO-AHA has a maximum absorbance at 428 nm, and UAHA has maxima at 476 and 374 nm. Although UAHA obscures TcNO-AHA, samples 16-36 can be used to deconvolute the spectra from samples 37-57. When this is done, it can be seen that the kinetics of the TcNO-AHA reaction are not affected by the presence of uranyl (FIG. 4).

Figure 4:
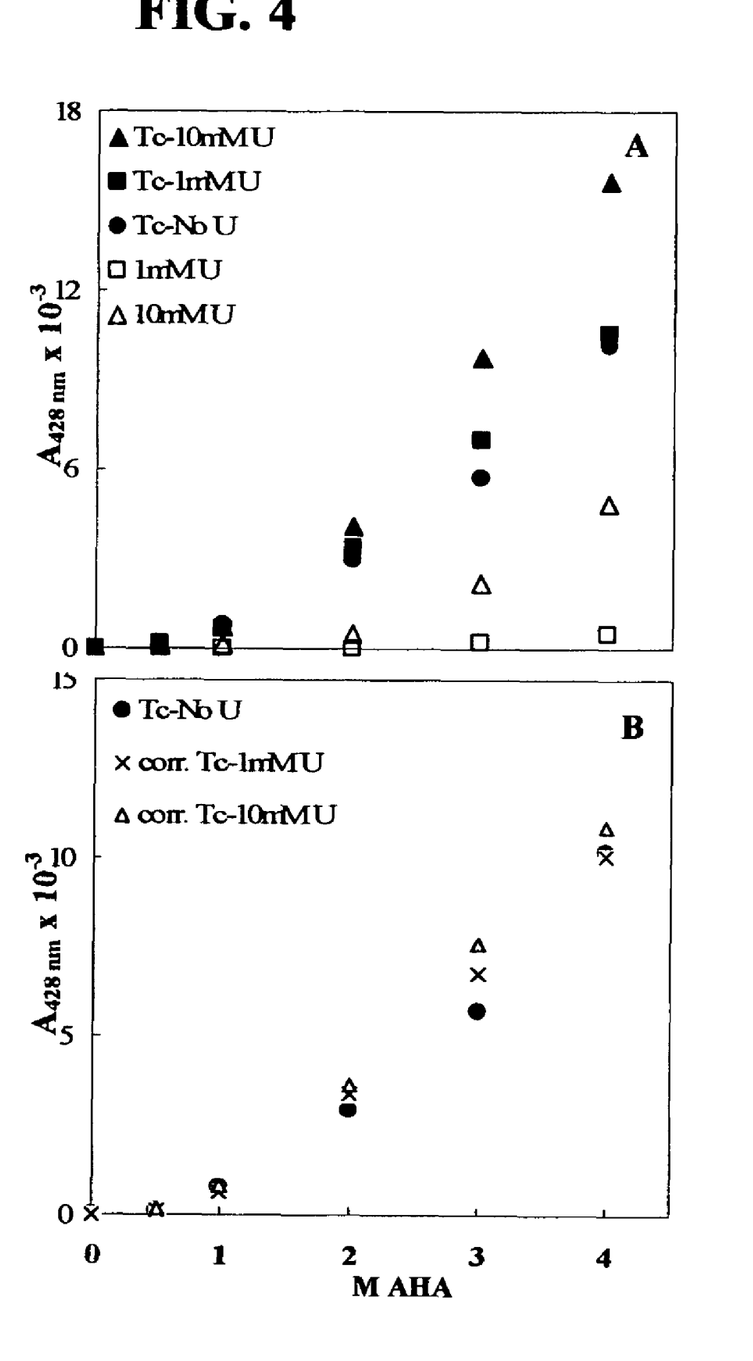
FIG. 4 shows Kinetics of the TcNO-AHA reaction. A, absorbance values of all samples. B, corrected absorbance of the Tc samples.

Further evidence for the orthogonal nature of the formation of the two AHA complexes can be seen in FIG. 4. Samples 37-45 were allowed to reach equilibrium, then diluted into a nitric acid matrix to a final $HNO_3$ concentration of 1 M—sufficient to hydrolyze UAHA, but not TcNO-AHA. The spectra were normalized to technetium concentration via LSC. At the higher uranyl concentrations, uranyl nitrate can be seen, but it is clear that TcNO-AHA is present in the same amount in all samples, indicating that the reaction proceeded to the same extent, despite the presence of hundredfold molar excess uranyl. This shows that the thermodynamics of the reaction are not affected by uranyl. Up to 4 M $HNO_3$ does not hydrolyze TcNO-AHA.

Figure 5:
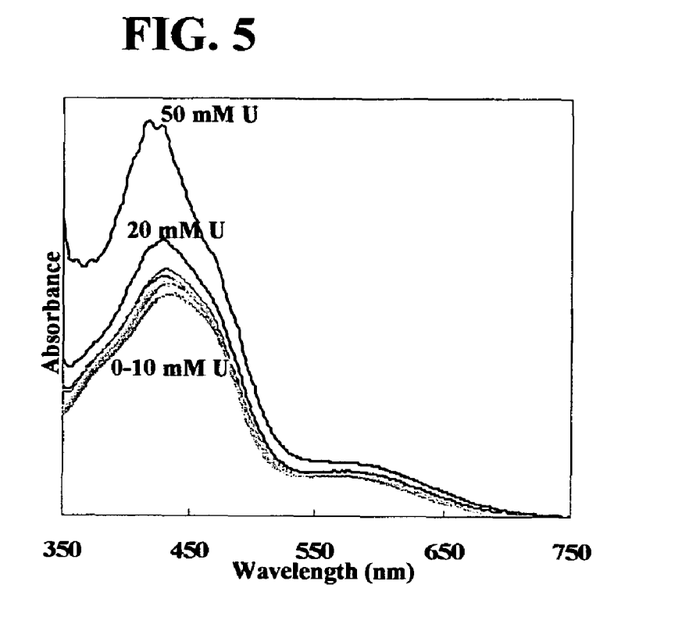
FIG. 5 shows Spectra of the hydrolyzed samples, normalized to liquid scintillation counts.

FIG. 5. Spectra of the Hydrolyzed Samples, Normalized to Liquid Scintillation Counts.

Extractions

Spectroscopy of the organic phase indicates that the uranyl extracts as uranyl nitrate. The spectra of samples 64 and 68 after one day (FIG. 5) are typical. There is an observed difference in the spectrum microstructure from 350-410 nm. This is observed in uranyl nitrate solutions and appears to be due to a difference in nitrate or nitric acid concentration in the organic phase; the breakdown of AHA increases the pH, decreasing the amount of $HNO_3$ extracted and altering the equilibrium between $UO_2(NO_3)_2$ and $HNO_3$. The technetium species extracted, likely pertechnetate, has no absorbance in the visible range, and the Tc in the organic phase decreases with time, in line with previous observations. The spectra of the aqueous phases after extraction are similar to those in FIG. 3, except that as U is removed via extraction, the TcNO-AHA contribution is more evident.

Figure 6:
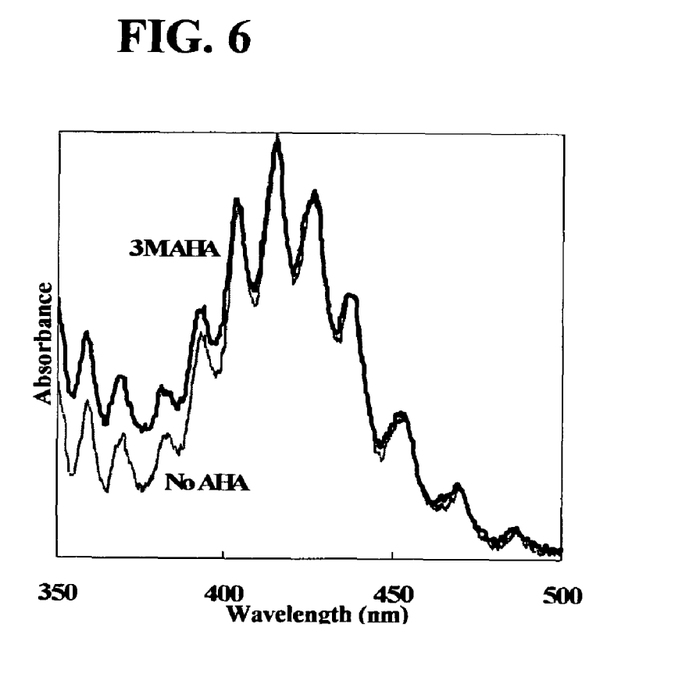
FIG. 6 shows Spectra of the organic phase of TBP extraction of Tc, U, and AHA in nitric acid.

FIG. 6. Spectra of the Organic Phase of TBP Extraction of Tc, U, and AHA in Nitric Acid.

The distribution coefficient of technetium begins to decrease immediately after acid is added, and neither U nor Tc demonstrate a significant change in extraction behavior as a function of uranyl concentration after the reaction has begun to proceed (Table 2). The distribution coefficients of both elements are time-dependent: after the reaction is complete, there is essentially no extraction of technetium and decreased extraction of uranium. When the pH is readjusted to zero, 86-91% of the U is extracted, whereas 98.5-99.6% of the Tc remains in aqueous solution. Technetium demonstrates a slight dependence on [U], which may be due to the formation of the extracted species $UO_2(NO_3)(TcO_4).2TBP$, the altered equilibrium between $UO_2(NO_3)_2$ and $HNO_3$, and/or uranium competition for AHA slightly increasing the amount of residual pertechnetate. Sequential extractions could increase this separation factor even more.

TABLE 2

Dependence of distribution coefficient on [U] concentration.

| | 15 minutes | | 6 hours | | 25 hours | | 3 days, pH 0 | |
|---|---|---|---|---|---|---|---|---|
| [U] | $K_d$ Tc | $K_d$ U | $K_d$ Tc | $K_d$ U | $K_d$ Tc | $K_d$ U | $K_d$ Tc | $K_d$ U |
| 0 | 0.57 | N/A | 0.13 | N/A | 0.052 | N/A | 0.0041 | N/A |
| 0.25 | 0.62 | 5.5 | 0.12 | 3.9 | 0.030 | 1.8 | 0.0045 | 6.1 |
| 0.50 | 0.71 | 4.5 | 0.13 | 3.4 | 0.026 | 1.0 | 0.0049 | 6.6 |
| 1.0 | 0.68 | 4.4 | 0.12 | 3.3 | 0.031 | 0.8 | 0.0051 | 7.8 |
| 2.0 | 0.52 | 4.5 | 0.12 | 4.0 | 0.026 | 1.2 | 0.0054 | 8.4 |
| 5.0 | 0.51 | 4.8 | 0.12 | 3.2 | 0.027 | 0.9 | 0.0079 | 8.5 |
| 10 | 0.66 | 5.4 | 0.13 | 3.5 | 0.035 | 1.2 | 0.0099 | 9.3 |
| 20 | 0.59 | 4.6 | 0.13 | 3.0 | 0.040 | 1.9 | 0.0117 | 9.9 |
| 50 | 0.62 | 5.5 | 0.13 | 4.0 | 0.030 | 1.2 | 0.0152 | 10.0 |

Figure 7:
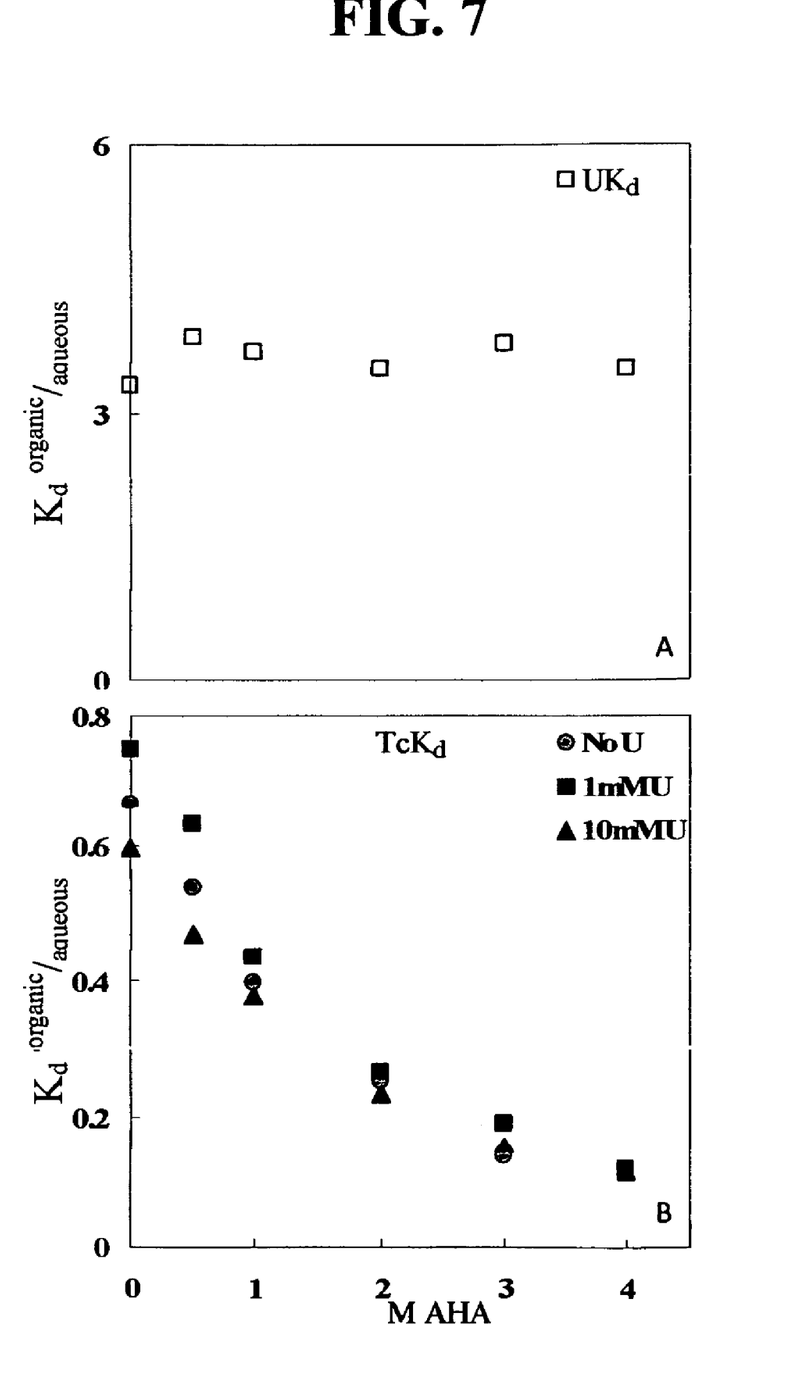
FIG. 7 shows Dependence of the distribution coefficient on the initial concentration of AHA, 6 hours after the addition of nitric acid.

The distribution coefficient for Tc, but not for U, depends strongly on the concentration of AHA (FIG. 7). This is likely because more TcNO-AHA is generated in higher AHA concentrations, but for U the pH difference due to additional AHA hydrolysis is negligible.

FIG. 7. Dependence of the distribution coefficient on the initial concentration of AHA, 6 hours after the addition of nitric acid. A, distribution of U. B, Distribution of Tc. At 30° C., the trends are the same, but the distribution constants are lower at all time points for both Tc and U. This is due to the faster reaction of AHA at higher temperatures, both to form TcNO-AHA and to hydrolyze.

There are other physical characteristics and physical events in the practices of the present technology that have been evaluated in the experimental work enabling practice of the present technology.

TABLE 3

Comparison of the magnetic moment of $Tc^{II}(NO)(AHA)_2H_2O$ with other technetium nitrosyl compounds (hyperfine splittings $\times 10^{-4}$ $cm^{-1}$). All g and A corrected for second order effects. Note that for 1, $g_1$ and $g_2$ are averaged and $A_1$ and $A_2$ are averaged to give g⊥ and A⊥ for comparison to the other values.
The reaction of $TcO_4^-$ with AHA in acid.

| Reagent | Observed Order | Partial $R^2$ |
|---|---|---|
| Formation of product, monitored at 428 nm | | |
| $HNO_3$ | | |
| $NH_4TcO_4$ | 1.028 ± 0.003 | 1.000 |
| $H^+$ | 0.991 ± 0.023 | 1.000 |
| AHA | 1.968 ± 0.149 | 0.994 |
| $HClO_4$ | | |
| $NH_4TcO_4$ | 0.967 ± 0.003 | 1.00 |
| $H^+$ | 1.004 ± 0.037 | 0.999 |
| AHA | 1.994 ± 0.193 | 0.991 |
| Loss of $TcO_4^-$, monitored at 289 nm | | |
| $NH_4TcO_4$ | 0.867 ± 0.055 | 0.996 |
| $HClO_4$ | 1.066 ± 0.052 | 0.998 |
| AHA | 1.742 ± 0.171 | 0.991 |

All of the complexes generated from hydroxylamine are distinct from $[Tc^{II}(NO)(AHA)_2(H_2O)]^+$, indicating that the ligands on 1 are not formed from the acid hydrolysis of AHA to hydroxylamine and acetic acid. Attempts to form 1 from mixtures of hydroxylamine and acetic acid ligand in nitric and perchloric acids formed other distinct complexes whose UV-vis spectra varied with the ratio of hydroxylamine to acetic acid. In contrast, the UV-vis spectrum of the reaction of AHA with pertechnetate was the same regardless of which mineral acid was used. These results strongly support the assignment of the equatorial ligands to AHA.

The slow rate of reaction of pertechnetate with AHA and the very rapid reaction of Tc(IV) with AHA, as well as the previously observed rapid reaction of Ru(III) with AHA, suggests that the technetium species reductively nitrosylated is a lower valent complex. In addition, the nitrosylating agent must be AHA itself, since the rate of reductive nitrosylation of Tc(IV) is much faster than the rate of hydrolysis of AHA to hydroxylamine. Furthermore, the observation that Tc(IV) is much more reactive than $TcO_4^-$ strongly supports a reductive nitrosylation mechanism similar to that previously proposed for the reductive nitrosylation of Ru(III), as illustrated in Scheme 1. The proposed mechanism is closely related to previously proposed mechanisms for reductive nitrosylation of V(V) by hydroxylamine studied by Wieghard and proceeds via a coordinated nitroxyl ligand. Since the terminal oxo group of Tc(VI), Tc(V) or Tc(IV) is more nucleophilic than a terminal oxo group of $TcO_4^-$, the postulate that reductive nitrosylation proceeds by initial nucleophilic attack on the coordinated carbonyl group of AHA is consistent with the observed reactivity.

FIG. 8—Scheme 1: Proposed Mechanism for Reductive Nitrosylation of Tc(VI) (n=1) or Tc(V) (n=2) by AHA.

As the reaction of lower-valent Tc complexes with AHA is rapid, the initial step is most likely reduction of $TcO_4^-$ to a lower valent complex that subsequently undergoes reductive nitrosylation. The observed partial reaction orders provide two indications about the potential mechanism. First, steps prior to the rate determining step (rds) involve one $TcO_4^-$, one proton, and two molecules of AHA. Second, the rate law for formation of 1 is the same as that for loss of $TCO_4^-$; therefore all steps prior to the rds must be reversible. This latter fact eliminates the most straightforward mechanism for the reaction of $TcO_4^-$ with AHA: the direct reaction of $TcO_4^-$ with AHA to produce $TcO_4^{2-}$, which will rapidly disproportionate to Tc(V). The reaction of $TcO_4^-$ with AHA would be irreversible, yielding a rate law for loss of $TcO_4^-$ equivalent to $k[TcO_4^-][AHA]$, not $k[TCO_4^-][H^+][AHA]$, as observed.

An alternative mechanism for reduction of $TcO_4^-$ to Tc(VI) is suggested by the reaction of alkenes with Tc(VII) complexes. In that study, $TcO_4^-$ was unreactive, but an octahedral Tc(VII) complex, $TcO_3(AA)Cl_3$ where AA is a diamine ligand such as 1,10-phenanthroline, was sufficiently oxidizing to react with alkenes to form a coordinated diol ligand. Likewise, $TcO_4^-$ may be insufficiently oxidizing to react with AHA, but an octahedral Tc(VII) complex is likely to be more oxidizing. The proposed mechanism for reduction of Tc(VII) to Tc(VI) involves a pre-equilibrium to form an octahedral Tc(VII) complex, as illustrated in Scheme 2. Thus, the overall proposed mechanism is the formation of an octahedral Tc(VII) complex that reacts with AHA to form an octahedral Tc(VI) complex, which either is reductively nitrosylated by the coordinated AHA ligand, as illustrated in Scheme 1, or disproportionates to form an octahedral Tc(V) complex that is reductively nitrosylated by the coordinated AHA ligand.

Scheme 2: Proposed mechanism for reduction of $TcO_4^-$ by AHA in aqueous acid.

| | | | |
|---|---|---|---|
| $TcO_4^-$ + AHA | ⇌ | $TcO_3(OH)(\eta^2\text{-AHA})^-$ | $K_1$ |
| $TcO_3(OH)(\eta^2\text{-AHA})^-$ + H | ⇌ | $TcO_3(OH_2)(\eta^2\text{-AHA})$ | $K_2$ |
| $TcO_3(OH_2)(\eta^2\text{-AHA})$ + AHA | → | $TcO_3(OH_2)(\eta^2\text{-AHA})^-$ + AHA$^+$ | $K_3$, irreversible, rds |

Extraction. In the absence of AHA, pertechnetate extraction into TBP was consistent with literature reports. Pertechnetate reduction begins immediately upon contact with acidic AHA, as does the decrease in the extraction of Tc. The increase of 1 from an initial solution of 0.5 mM $NH_4TcO_4$ and 1 M $HNO_3$, charted as a function of AHA concentration via its absorbance maximum, can be correlated with a decrease of the technetium distribution between the aqueous and TBP phases.

TABLE 3

| Complex | $g_\parallel$ | $g\perp$ | $g_{av}{}^\ddagger$ | $A_\parallel$ | $A\perp$ | $A_{av}{}^\S$ | ref |
|---|---|---|---|---|---|---|---|
| $[TcNO(H_2O)AHA_2]^+$ | | | 1.999 (1) | | | 156 (1) | This study |
| $[TcNOCl_3(acac)]^{-*}$ | 1.946 | 2.017 | 1.993 | 258 | 105 | 156.0 | 29 |
| $[TcNO(H_2O)(NH_3)_4]^{3+}$ | 1.861 | 2.114 | 2.030 | 258 | 108 | 158.0 | 29 |
| $[TcNOCl_5]^{2-}$ | 1.891 | 2.104 | 2.033 | 248 | 107 | 154.0 | 29 |
| $[TcNOCl_5]^{2-}$ | 1.985 | 2.037 | 2.020 | 260 | 111 | 160.7 | 29 |
| $[TcNOCl_3P_2]^{**}$ | 2.034 | 2.053 | 2.047 | 214.5 | 88 | 130.2 | 23 |
| $[TcNOBr_3P_2]^{**}$ | 2.119 | 2.1 | 2.106 | 184.1 | 79 | 114.0 | 23 |
| $[TcNOBr_4]$ | 2.105 | 2.081 | 2.089 | 216 | 89 | 131.3 | 29 |
| $[TcNOI_4]$ | 2.262 | 2.144 | 2.183 | 155 | 73 | 100.3 | 29 |
| $[TcNO(NCS)_5]^{2-}$ | 1.936 | 2.042 | 2.007 | 240 | 99 | 146.0 | 29 |
| $[TcNO(NCS)_5]^{2-}$ | 1.928 | 2.045 | 2.006 | 236 | 95 | 142.0 | 29 |
| $[TcNSCl_5]^{2-}$ | 1.984 | 2.041 | 2.022 | 266 | 119 | 168.0 | 29 |
| $[TcNSCl_3P_2]^{**}$ | 2.027 | 2.039 | 2.035 | 236.7 | 106.3 | 149.8 | 23 |
| $[TcNSBr_3P_2]^{**}$ | 2.103 | 2.078 | 2.086 | 205.4 | 94 | 131.1 | 23 |
| $[Tc2Cl5P_3]^{**}$ | 1.95 | 2.03 | 2.003 | 146 | 133 | 137.3 | † |

$^\ddagger g_{av} = (g_\parallel + 2\, g\perp)/3$
$^\S A_{av} = (A_\parallel + A\perp)/3$
*acac = 2,4-pentanedione
**P = (Me$_2$PhP)
† Cotton, F. A., Haefner, S. C., Sattelberger, A. P. Inorg. Chem. 1996, 35, 1831-1838.

TABLE 4

Slopes of the kinetics, natural log of slopes and initial reagent concentration, and errors for determination of partial orders of the reagents to make TcNO-AHA.

| Reagent | Conc. | Slope | Slope error | Ln[reag.] | Ln |slope| | Ln error |
|---|---|---|---|---|---|---|
| Growth of TcNO-AHA in $HNO_3$ | | | | | | |
| AHA | 4 | 1.747E−03 | 3.099E−05 | 0.000 | −6.350 | 0.0177 |
|  | 2 | 8.537E−04 | 1.440E−05 | −0.693 | −7.066 | 0.0169 |
|  | 1 | 4.201E−04 | 6.449E−06 | −1.386 | −7.775 | 0.0153 |
| Tc | 1 | 1.651E−03 | 3.330E−05 | 0.000 | −6.406 | 0.0202 |
|  | 0.5 | 8.415E−04 | 1.540E−05 | −0.693 | −7.080 | 0.0183 |
|  | 0.25 | 4.323E−04 | 6.885E−06 | −1.386 | −7.746 | 0.0159 |
| $HNO_3$ | 2 | −1.714E−03 | 3.651E−05 | 0.000 | −6.369 | 0.0213 |
|  | 1 | −1.003E−03 | 2.448E−05 | −0.693 | −6.904 | 0.0244 |
|  | 0.5 | −5.141E−04 | 1.113E−05 | −1.386 | −7.573 | 0.0216 |
| Growth of TcNO-AHA in $HClO_4$ | | | | | | |
| AHA | 4 | 9.722E−04 | 1.461E−05 | 1.386 | −6.936 | 0.0150 |
|  | 2 | 2.972E−04 | 1.139E−06 | 0.693 | −8.121 | 0.0038 |
|  | 1 | 6.351E−05 | 6.628E−07 | 0.000 | −9.664 | 0.0104 |
| Tc | 1 | 8.547E−04 | 1.123E−05 | 1.386 | −7.065 | 0.0131 |
|  | 0.5 | 2.704E−04 | 1.800E−06 | 0.693 | −8.215 | 0.0067 |
|  | 0.25 | 5.385E−05 | 1.078E−06 | 0.000 | −9.829 | 0.0200 |
| $HClO_4$ | 2 | −1.077E−03 | 1.220E−06 | 1.386 | −6.834 | 0.0011 |
|  | 1 | −3.953E−04 | 2.477E−06 | 0.693 | −7.836 | 0.0063 |
|  | 0.5 | −9.628E−05 | 1.470E−05 | 0.000 | −9.248 | 0.1526 |
| Decrease of $TcO_4^-$ in $HClO_4$ | | | | | | |
| AHA | 4 | 2.424E−03 | 9.348E−05 | 0.693 | −6.022 | 0.0386 |
|  | 2 | 1.187E−03 | 1.116E−05 | 0.000 | −6.737 | 0.0094 |
|  | 1 | 6.135E−04 | 1.322E−05 | −0.693 | −7.396 | 0.0215 |
| Tc | 1 | 2.512E−03 | 1.183E−04 | 0.693 | −5.987 | 0.0471 |
|  | 0.5 | 1.198E−03 | 1.512E−05 | 0.000 | −6.727 | 0.0126 |
|  | 0.25 | 6.246E−04 | 6.550E−06 | −0.693 | −7.378 | 0.0105 |
| $HClO_4$ | 2 | −3.123E−03 | 1.259E−04 | 0.693 | −5.769 | 0.0403 |
|  | 1 | −1.401E−03 | 1.950E−05 | 0.000 | −6.570 | 0.0139 |
|  | 0.5 | −7.122E−04 | 3.668E−06 | −0.693 | −7.247 | 0.0052 |

TABLE 5

Liquid scintillation data from the extraction of the potentiometric titration of $[Tc^{II}(NO)(AHA)_2(H_2O)]^+$: counts per minute in the beta radiation region of interest of the pre-extraction initial solution, the post-extraction organic and aqueous phases.

| pH | Initial cpm | Organic cpm | Aqueous cpm |
|---|---|---|---|
| Acid titrated | | | |
| −0.6* | 14580 | 29 | 13996 |
| −0.3* | 15455 | 23 | 15613 |
| −0.05* | 16484 | 23 | 16649 |
| 0.04* | 16940 | 23 | 16162 |
| 0.23* | 16922 | 22 | 16062 |
| 0.52* | 17293 | 22 | 16410 |
| 1.04 | 17761 | 28 | 17455 |
| 1.56 | 17493 | 29 | 17007 |
| 1.83 | 17996 | 29 | 17710 |
| 2.77 | 17163 | 31 | 16493 |
| 3.19 | 17626 | 20 | 17383 |
| Base titrated | | | |
| 3.25 | 16922 | 21 | 16297 |
| 3.47 | 16615 | 24 | 16743 |
| 3.95 | 16597 | 22 | 16303 |
| 4.46 | 16548 | 40 | 16480 |
| 4.72 | 16406 | 23 | 16200 |
| 5.02 | 16181 | 23 | 15987 |
| 5.26 | 15935 | 23 | 15861 |
| 5.52 | 15976 | 23 | 15152 |
| 6.01 | 16474 | 26 | 16444 |
| 6.54 | 16250 | 25 | 16418 |
| 7.01 | 15388 | 23 | 16763 |
| 7.53 | 15603 | 20 | 15934 |
| 8.24 | 15582 | 22 | 15920 |
| 8.47 | 15867 | 21 | 15795 |
| 9.17 | 16289 | 23 | 16095 |
| 9.71 | 15778 | 19 | 16119 |
| 11.88* | 15209 | 21 | 15954 |

*Calculated pH

What is claimed is:

1. A spent fuel reprocessing method comprising contacting an aqueous solution containing Technetium(V) and uranyl with an acidic solution comprising hydroxylamine hydrochloride or acetohydroxamic acid to reduce Tc(V) to Tc(II), and then extracting the uranyl with an organic phase, leaving technetium(II) in aqueous solution.

2. A method of claim 1 wherein the aqueous solution is contacted with acetohydroxamic acid.

3. A method of claim 1 in which the aqueous phase comprises U, Tc and an inorganic acid.

4. The method of claim 3 wherein the acidic solution comprises mineral acid.

5. A Purex reprocessing method comprising treating an active aqueous solvent feed entering a U/Pu split operation with an acidic solution comprising hydroxylamine hydrochloride or acetohydroxamic acid to reduce Tc(V) to Tc(II), and then extracting a uranyl with an organic phase, leaving technetium(II) in aqueous solution.

6. A method of claim 5 in which the aqueous solvent feed comprises U, Tc and an inorganic acid.

7. The method of claim 6 wherein the acidic solution comprises mineral acid.

* * * * *